United States Patent [19]
Sheets et al.

[11] Patent Number: 5,992,943
[45] Date of Patent: Nov. 30, 1999

[54] WHEEL END ASSEMBLY

[75] Inventors: James H Sheets; Paul R. Pollock, both of Fort Wayne; David G. Moses, Decatur, all of Ind.

[73] Assignee: Dana Corporation, Toledo, Ohio

[21] Appl. No.: 08/895,625

[22] Filed: Jul. 17, 1997

[51] Int. Cl.⁶ .................................................. B60B 27/06
[52] U.S. Cl. .................... 301/111; 301/126; 301/105.1; 301/131; 384/13; 384/93; 384/94; 384/462; 384/477; 29/898.07; 29/898.062
[58] Field of Search ................................ 301/124.1, 126, 301/105.1, 131, 111; 384/13, 93, 94, 462, 477; 29/898.07, 898.062

[56] References Cited

U.S. PATENT DOCUMENTS

| | | | |
|---|---|---|---|
| 580,468 | 4/1897 | Roberts | 301/105.1 |
| 882,846 | 3/1908 | Sachs | 301/105.1 |
| 1,265,347 | 5/1918 | Ledwinka | 301/105.1 |
| 2,173,584 | 9/1939 | Frank | 301/105.1 |
| 2,287,009 | 6/1942 | Alden . | |
| 2,622,934 | 12/1952 | Phelps | 301/105.1 |
| 3,806,214 | 4/1974 | Keiser . | |
| 3,981,513 | 9/1976 | Erskine | 280/95 |
| 4,054,999 | 10/1977 | Harbottle | 29/898.062 |
| 4,345,485 | 8/1982 | Livet et al. | 74/5.1 |
| 4,417,462 | 11/1983 | Palovcik | 301/124.1 |
| 4,613,240 | 9/1986 | Hagelthorn | 384/585 |
| 4,632,202 | 12/1986 | Narbut | 301/126 |
| 4,811,992 | 3/1989 | Steiner | 301/124.1 |
| 4,900,166 | 2/1990 | Candiard . | |
| 5,090,778 | 2/1992 | Laudszun et al. | 301/105.1 |
| 5,174,839 | 12/1992 | Schultz et al. | 301/105.1 |
| 5,236,028 | 8/1993 | Goodell et al. | 301/105.1 |
| 5,354,391 | 10/1994 | Goodell et al. | 301/105.1 |
| 5,386,630 | 2/1995 | Fox | 29/898.09 |
| 5,476,272 | 12/1995 | Hixson, II | 277/152 |
| 5,560,687 | 10/1996 | Hagelthorn | 301/124.1 |
| 5,658,053 | 8/1997 | Vencill et al. | 301/105.1 |
| 5,743,016 | 4/1998 | Manne et al. | 29/898.062 |
| 5,757,084 | 5/1998 | Wagner | 301/105.1 |
| 5,772,285 | 6/1998 | Bigley et al. | 301/105.1 |

FOREIGN PATENT DOCUMENTS

| | | | |
|---|---|---|---|
| 624813 | 3/1935 | Germany | 301/132 |
| 2115692 | 12/1971 | Germany | 301/105.1 |
| 3919475 | 2/1990 | Germany | 301/124.1 |
| 3900356 | 7/1990 | Germany | 301/105.1 |
| 284195 | 11/1990 | Germany | 301/105.1 |
| 2009896 | 3/1994 | Russian Federation | 301/105.1 |

*Primary Examiner*—D. Glenn Dayoan
*Assistant Examiner*—Long Bao Nguyen
*Attorney, Agent, or Firm*—Oldham & Oldham Co., L.P.A.

[57] ABSTRACT

A wheel mount for a wheel comprises a spindle, a hub for surrounding the spindle and a bearing assembly interposed between the spindle and the hub. The spindle extends from an end of an axle of a vehicle and has a generally decreasing diameter from its proximal end to its distal end. The spindle is provided with a pair of lands near the ends of the spindle for receiving bearings, and has bearing retainers near the respective ends also, the distal retainer being removably attached. These inboard and outboard bearing retainers define an axial bearing space. The hub has a central aperture with an inboard land and an outboard land provided on an internal surface of the central aperture, also for receiving bearings. The bearing assembly comprises an inboard bearing and an outboard bearing in spaced apart relationship within the axial bearing space. The inboard bearing has an internal diameter larger than the internal diameter of the outboard bearing. The bearing assembly further has a conical shim placed in frictional fit between the cone portions of the inboard and outboard bearings and holding the respective bearings in the spaced apart relationship.

11 Claims, 2 Drawing Sheets

WHEEL END ASSEMBLY

The present invention relates to an improved wheel end assembly for a vehicle. More particularly, the present invention relates to an improved wheel end assembly which provides a reduced-maintenance capability by incorporating both the wheel bearing and the lubrication seal within the present confines provided for the wheel bearing. More particularly, the present invention relates to a wheel end assembly for a vehicle having the inboard and outboard wheel bearing assemblies positioned on the spindle such that the outboard wheel bearing has a smaller diameter than the inboard wheel bearing.

BACKGROUND OF THE ART

In the vehicle heavy axle industry, it is necessary to provide wheel ends for both non-driven and driven wheels. Because of the need for interchanging tires and wheel hubs on these axles, it is necessary that certain industry standards be provided with the spindles for both driven and non-driven wheels. Current wheel seal technology generally uses oil lubrication and warranty problems relating to the wheel seal are significant in certain situations, particularly with regard to seal lubrication leakage. Some known designs present features which address bearing endplay/preload conditions, and these help to improve seal life. However, if the seal can be integrated with the bearing structure, the seal will be dimensionally more stable and controlled, and provide better protection from service and environmental conditions.

An objective not believed to be achieved by the prior art is the integration of the wheel seal and the wheel bearing within the same dimensional confines as the existing industrial standard wheel bearing, as well as use of grease for lubrication rather than oil.

SUMMARY OF THE INVENTION

It is therefore an object of the present invention to provide a wheel end assembly where the wheel seal is integrated with the wheel bearing and contained within the same dimensional confines as the existing industrial standard wheel bearing. It is a further object to provide such a wheel end assembly having grease lubrication rather than oil lubrication. These and other objects of the invention are provided by a mount for a wheel of a vehicle comprising a spindle, a hub and a bearing assembly. The spindle extends from an end of an axle and generally decreases in diameter from a proximal end thereof to a distal end thereof. The spindle is provided with an inboard land near the proximal end and an outboard land near the distal end and has an inboard bearing retainer near the proximal end and an outboard bearing retainer near the distal end. These inboard and outboard bearing retainers define an axial bearing space. The hub surrounds the spindle, and has a central aperture with an inboard land and an outboard land provided on an internal surface of the central aperture. The bearing assembly is interposed between the spindle and the hub. It has an inboard bearing and an outboard bearing in spaced apart relationship within the axial bearing space, the inboard bearing having an internal diameter larger than an internal diameter of the outboard bearing and with a conical spacing shim in an interference fit between the cone portions of the inboard and outboard bearings.

BRIEF DESCRIPTION OF THE DRAWINGS

A better understanding of the present invention will be had when reference is made to the accompanying drawings, wherein identical reference numerals are used on identical parts and wherein.

DETAILED DESCRIPTIONS OF THE INVENTION

Figure 1:
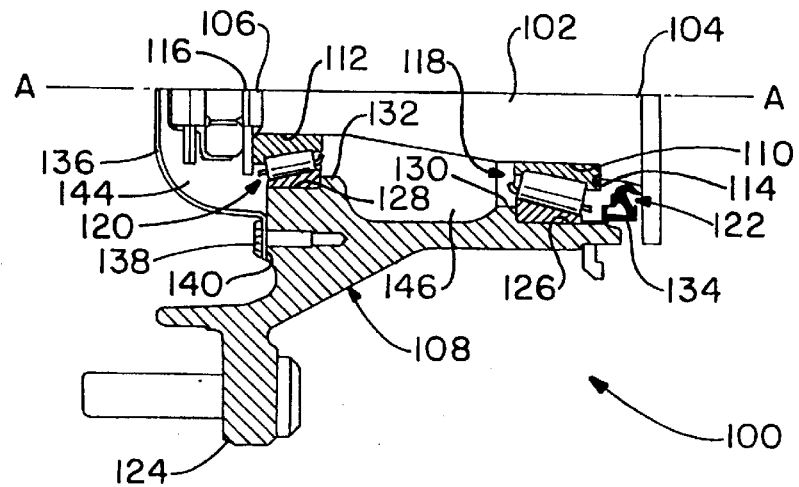
FIG. 1 shows in partial section elevation view a lower half of a wheel mount of a non-driven axle as known in the prior art.
Figure 2:
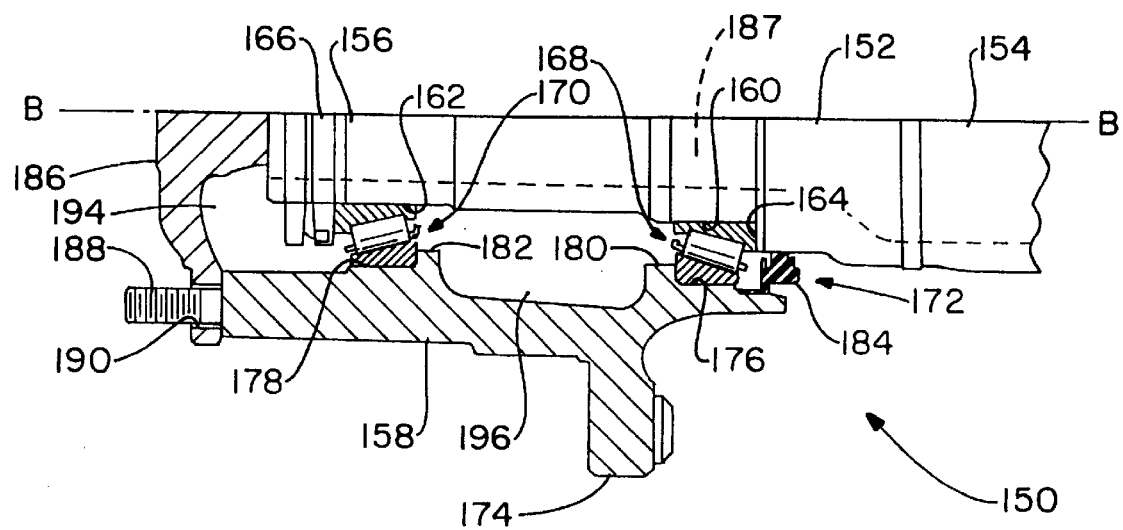
FIG. 2 shows in partial section elevation view a lower half of a wheel mount of a driven axle as known in the prior art.

FIGS. 1 and 2 show wheel mounts as known in the existing art. FIG. 1 shows the lower half of the wheel mount 100 for a non-driven axle of a vehicle, such as a front steer axle of a trailer. Although the top half of the wheel mount is not shown, it will be understood that the top half is a mirror image of the lower half, since axis A provides an axis of symmetry for the wheel mount and the associated structures. Similarly, FIG. 2 shows the lower half of the wheel mount 150 for a driven axle of the same type of vehicle. As with FIG. 1, axis B provides an axis of symmetry, so features of the upper half will be known to be mirror images of those shown in the lower half.

Wheel mount 100 has substantially solid axle spindle 102 which extends from the end of the vehicle axle (not shown), with a proximal end 104 of the spindle affixed to the vehicle and a distal end 106 unaffixed. Since wheel mount 100 is for a non-driven axle of the vehicle, there is no need to transfer drive torque through the axle to the wheel through a hub 108, so spindle 102 does not rotate and provides a site for rotation of the hub. Several features of the spindle 102 are notable. The spindle 102 is generally decreasing in diameter from proximal end 104 to distal end 106, but a pair of flat lands for mounting of the hub 108 are provided. The first of these is an inboard land 110, positioned towards the proximal end 104 and the second is an outboard land 112, positioned towards the distal end 106. Because of the decreasing diameter from the proximal end to the distal end, the diameter of the spindle at the outboard land is notably smaller than the diameter at the inboard land. At the end of the inboard land 110 towards the proximal end 104 of the spindle, a step increase in the spindle diameter occurs, providing a shoulder 114 in the spindle at the inboard end of the inboard land. Typically, this step increase will be a machined feature of the spindle, and is intended to serve as a means for retaining an inboard bearing mounted in the hub, particularly to prevent axial movement of the inboard bearing toward the proximal end of the spindle. As such, it completes the bearing seat provided by the inboard land. The outboard end of the outboard land 112, that is, the end nearer or towards the distal end 106, will be adapted to receive a device for retaining a bearing pressed into the hub when a wheel assembly is mounted on the spindle. Typically, the adaptation to the spindle will be the placement of threading at the distal end to allow reception of a nut, a washer and nut or a combination of a washer, a nut and a locking means, such as a cotter pin. It is this combination which is indeed shown in FIG. 1 and designated as reference numeral 116.

When the inboard and outboard bearing retainers 114, 116, respectively, are in place and a hub with inboard and outboard bearings 118, 120, respectively, is mounted on and secured to the spindle, the facing surfaces of the respective retainers 114, 116 serve to define an axial bearing space within which the bearings 118, 120 are constrained from axial movement, although it will be noted that there is no constraint near the spindle restricting or constraining axial movement of the bearings towards each other.

Having already been introduced, further features the hub 108 are now described. The hub is an annular structure with a central aperture 122 therethrough, the axis of the hub being coincident with axis A of the spindle 102 when the hub is mounted on the spindle, as shown in FIG. 1. The major portion of the hub body runs axially along the spindle and extends along the spindle approximately the same length as the axial bearing space. A radially extending flange 124 is provided with means for affixing a wheel. A first end of the central aperture is provided with a bore 126 which serves as an inboard land when the hub is mounted on the spindle and the opposite second end of the hub is provided with a bore 128 which serves as an outboard land. These bores 126, 128 are on the internal surface of the central aperture and each provides a shoulder 130, 132, respectively, at the base of the bore internal to the hub. Each of the bores 126, 128 are sized in terms of depth and diameter to permit press fitting of the bearings 118, 120 into the bore. The shoulders 130, 132 provide a constraint to axial movement of the respective bearings being held.

The bearings 118, 120 are interposed between the spindle 102 and the hub 108 to provide for rotation of the hub upon the spindle. Each of the bearings comprises a cylindrical cone having an outer raceway, a cylindrical cup with an inner raceway and a plurality of tapered rollers circumferentially spaced in a cage mounted in the raceways, as is known in the prior art. The cone portion of each bearing is sized to frictionally engage the spindle 102 at one of the lands 110,112 provided thereon and the cup portion is sized for being press fit into frictional engagement with one of the bores 126,128 at the land in the central aperture of the hub presented by the bore. As shown in FIG. 1, the hub 108 is further provided with an annular lubrication seal 134, which is frictionally fitted into bore 126 after the insertion of the bearing 118. The particular lubrication seal shown in FIG. 1 is an elastomeric type of lip seal which extends axially from the bearing 118 such that its lip bears on the spindle axially inboard of the shoulder 114. The outer diameter of the seal 134 is frictionally fitted against bore 126 in which the inboard bearing is mounted, although inboard of the bearing. Because of the decreasing diameter of the spindle 102 as it extends outwardly from its proximal end 104, outboard bearing 120 is smaller in both internal diameter and external diameter than inboard bearing 118.

A last feature noted in the prior art wheel mount 100 as shown in FIG. 1 is the provision of a distal end cap 136 to the mount. This end cap 136 would not normally be in place during the placement of the hub 108 on the spindle 102, but once the hub, with its frictionally engaged bearings, is seated upon the spindle and the washer, nut and locking device comprising the outboard bearing retainer are fastened in place, the end cap may be fixed in place. Typically, the cap 136 is held in place by a plurality of fasteners 138 passing through circumferentially spaced apertures 140 in the cap into corresponding apertures 142 in the hub. Since the end cap 136 effectively seals off the distal end of the outboard bearing, the placement of the end cap effectively forms a lubrication reservoir which includes the interior 144 of the end cap and the internal portion 146 of the central aperture between the bearings 118,120.

Attention is now directed to wheel mount 150 as shown in FIG. 2. Instead of having a substantially solid axle spindle as in the non-driven axle, the driven axle wheel mount 150 provides a hollow spindle 152 which extends from the end of the vehicle axle, with a proximal end 154 of the spindle affixed to the vehicle and a distal end 156 unaffixed. Internal to the spindle 152, a drive axle 153 provides drive torque to the hub 158, as will be described below. Spindle 152, however, does not rotate and provides a site for rotation of the hub 158. Spindle 152 is generally decreasing in diameter from proximal end 154 to distal end 156, but a pair of flat lands for mounting of the hub 158 are provided along the length. The first of these is an inboard land 160, positioned towards the proximal end 154 and the second is an outboard land 162, positioned towards the distal end 156. At the end of the inboard land 160 towards the proximal end 154 of the spindle, a step increase in the spindle diameter occurs, providing a shoulder 164 in the spindle at the inboard end of the inboard land. Typically, this step increase will be a machined feature of the spindle, and is intended to serve as a means for retaining an inboard bearing mounted in the hub, particularly to prevent axial movement of the inboard bearing toward the proximal end of the spindle. As such, it completes the bearing seat provided by the inboard land. The outboard end of the outboard land 112, that is, the end nearer or towards the distal end 156, will be adapted to receive a device for retaining a bearing pressed into the hub when a wheel assembly is mounted on the spindle. Typically, the adaptation to the spindle will be the placement of threading at the distal end to allow reception of a nut, a washer and nut or a combination of a washer, a nut and a locking means, such as a cotter pin. It is this combination which is indeed shown in FIG. 2 and designated as reference numeral 166.

When the inboard and outboard bearing retainers 164, 166, respectively, are in place and a hub 158 with inboard and out board bearings 168, 170, respectively, is mounted on and secured to the spindle 152, the facing surfaces of the respective retainers 164, 166 serve to define an axial bearing space within which the bearings 168, 170 are constrained from axial movement. As in the non-driven axle case above, there is no constraint near the spindle restricting or constraining axial movement of the bearings towards each other.

Hub 158 is an annular structure with a central aperture 172 therethrough, the axis of the hub being coincident with axis B of the spindle 152 when the hub is mounted on the spindle, as shown in FIG. 2. The major portion of the hub body runs axially along the spindle and extends along the spindle approximately the same length as the axial bearing space. A radially extending flange 174 is provided with means for affixing a wheel. A first end of the central aperture 172 is provided with a bore 176 which serves as an inboard land when the hub is mounted on the spindle and the opposite second end of the hub is provided with a bore 178 which serves as an outboard land. These bores 176, 178 are on the internal surface of the central aperture and each provides a shoulder 180, 182, respectively, at the base of the bore internal to the hub. Each of the bores 176, 178 are sized in terms of depth and diameter to permit press fitting of the bearings 168, 170 into the bore. The shoulders 180, 182 provide a constraint to axial movement of the respective bearings being held.

The bearings 168, 170 are interposed between the spindle 152 and the hub 158 to provide for rotation of the hub upon the spindle. Each of the bearings 168, 170 comprises a cylindrical cone having an outer raceway, a cylindrical cup with an inner raceway and a plurality of tapered rollers circumferentially spaced in a cage mounted in the raceways, as is known in the prior art. The cone portion of each bearing is sized to frictionally engage the spindle 152 at one of the lands 160, 162 provided thereon and the cup portion is sized for being press fit into frictional engagement with one of the bores 176, 178 at the land in the central aperture of the hub presented by the bore. As shown in FIG. 2, the hub 158 is further provided with an annular lubrication seal 184, which is frictionally fitted into the inboard end of the central aperture 172 after the insertion of the bearing 168. The particular lubrication seal 184 shown in FIG. 2 is an elastomeric type of lip seal which extends axially from the bearing 168 such that its lip bears on the spindle axially inboard of the shoulder 164. The outer diameter of the seal 184 is frictionally fitted against a bore 185 in hub 158 which is external of and larger than bore 176 in which the inboard bearing is mounted. Because of the decreasing diameter of the spindle 152 as it extends outwardly from its proximal end 154, outboard bearing 170 is smaller in both internal diameter and external diameter than inboard bearing 168.

Because the wheel mount 150 is on a driven axle, a drive hub 186 is used to connect the drive axle 187 internal to the hollow spindle 152 to the wheel hub 158. This drive hub 186 would not normally be in place during the placement of wheel hub 158 on the spindle 152, but once the wheel hub, with its frictionally engaged bearings 168, 170, is seated upon the spindle and the washer, nut and locking device comprising the outboard bearing retainer 166 are fastened in place, the drive hub 186 may be fixed in place. Typically, the drive hub 186 is held in place by a plurality of bolts 188 which extend outwardly from wheel hub 158 through circumferentially spaced apertures 190 in the drive hub and are secured by a corresponding plurality of nuts (not shown). Since the drive hub 186 effectively seals off the distal end of the outboard bearing 170, the placement of the drive hub effectively forms a lubrication reservoir which includes the interior 194 of the end cap and the internal portion 196 of the central aperture between the bearings 168, 170.

Figure 3:
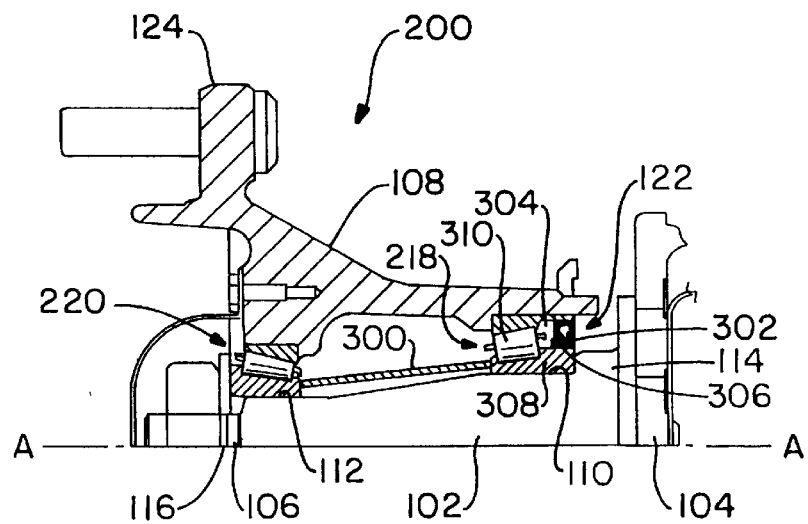
FIG. 3 shows in partial section elevation view an upper half of a wheel mount of a non-driven axle incorporating the present invention.
Figure 4:
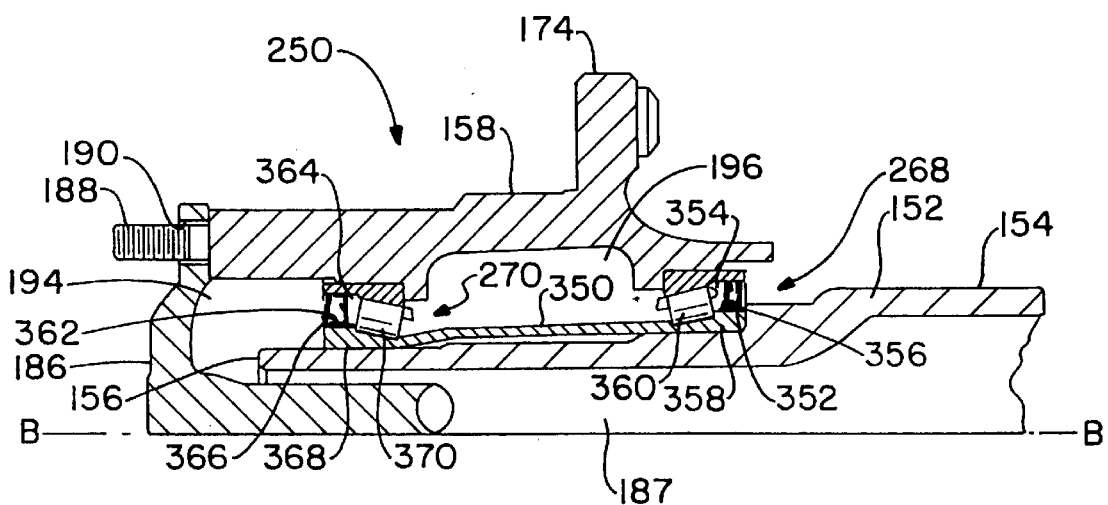
FIG. 4 shows in partial section elevation view an upper half of a wheel mount of a driven axle incorporating the present invention.

Attention is now directed to FIGS. 3 and 4, which show wheel mounts of the present invention. FIG. 3 shows the lower half of a wheel mount 200 for a non-driven axle of a vehicle, such as a trailer. Although the top half of the wheel mount is not shown, it will be understood that the top half is a mirror image of the lower half, since axis A provides an axis of symmetry for the wheel mount and the associated structures. Similarly, FIG. 4 shows the lower half of the wheel mount 250 for a driven axle of the same type of vehicle. As with FIG. 3, axis B provides an axis of symmetry, so features of the upper half will be known to be mirror images of those shown in the lower half.

Wheel mount 200 has substantially solid axle spindle 102 exactly as described in association with FIG. 1, since an objective of the present invention is to improve the existing wheel mount while modifying as few of the existing parts as necessary. Spindle 102 has a proximal end 104 affixed to the vehicle and a distal end 106 unaffixed. Spindle 102 does not rotate and provides a site for rotation of the hub 108. As in the prior art, spindle 102 is generally decreasing in diameter from proximal end 104 to distal end 106, but a pair of flat lands for mounting of the hub 108 are provided. The first of these is an inboard land 110, positioned towards the proximal end 104 and the second is an outboard land 112, positioned towards the distal end 106. Because of the decreasing diameter from the proximal end to the distal end, the diameter of the spindle at the outboard land is notably smaller than the diameter at the inboard land. At the end of the inboard land 110 towards the proximal end 104 of the spindle, a step increase in the spindle diameter occurs, providing a shoulder 114 in the spindle at the inboard end of the inboard land, which is intended to serve as a means for retaining an inboard bearing mounted in the hub, particularly to prevent axial movement of the inboard bearing toward the proximal end of the spindle. As such, it completes the bearing seat provided by the inboard land. The outboard end of the outboard land 112, that is, the end nearer or towards the distal end 106, will be adapted to receive a device for retaining a bearing pressed into the hub when a wheel assembly is mounted on the spindle. Typically, the adaptation to the spindle will be the placement of threading at the distal end to allow reception of a nut, a washer and nut or a combination of a washer, a nut and a locking means, such as a cotter pin. It is this combination which is indeed shown in FIG. 3 and designated as reference numeral 116.

When the inboard and outboard bearing retainers 114, 116, respectively, are in place and a hub 108 with inboard and out board bearings 218, 220, respectively, is mounted on and secured to the spindle, the facing surfaces of the respective retainers 114, 116 serve to define an axial bearing space within which the bearings 218, 220 are constrained from axial movement. Additionally, a conical shim 300 is positioned concentric to spindle 102 between the bearings 218, 220 such that the conical shim and the bearings are effectively in a frictional axial fit within the axial bearing space. This addition complements the action of the inboard and outboard bearing retainers, which constrain only outward axial movement of the bearings by constraining axial movement of the bearings towards each other.

Generally, the outboard bearing 220 will be identical to outboard bearing 120, but the inboard bearing 218 should be carefully noted. Inboard bearing 218 has an annular lubrication seal 302 built into the bearing so that the elastomeric lip seal is frictionally fitted into the cup portion 304 of the bearing and the lip 306 bears on the cone portion 308. Since the lip does this, the lubrication seal 302 is constrained within the axial bearing space and the spindle 102 is completely free of any contact with the hub or any hub components inboard of the shoulder 114, allowing alternate use of this region, one example of which would be placement of a angular velocity sensor device. As in the prior art shown in FIG. 1, outboard bearing 220 is smaller in both internal diameter and external diameter than inboard bearing 218. To accommodate the placement of the lubrication seal 302 into the bearing, the rollers 310 of bearing 218 will have a shorter length than in bearing 118.

As in the prior art, the wheel mount 200 is provided with a distal end cap 136, but in this case it is expected that the improved ability to seal the inboard end of the lubrication reservoir will permit a grease-based lubrication regime to be used instead of an oil-based lubrication. This would be expected to result in fewer failures of the wheel mount due to lubrication loss.

Attention is now directed to wheel mount 250 as shown in FIG. 4. Many of the structures are identical to those taught in association with FIG. 2, and the spindle 152 and hub 158 are identical with those of FIG. 2, consistent with the philosophy of using the existing technology as much as possible. As in FIG. 3, a conical shim 350 is positioned concentric to spindle 152 between the bearings 268, 270 such that the conical shim and the bearings are effectively in a frictional axial fit within the axial bearing space. This addition complements the action of the inboard and outboard bearing retainers 164, 166, which constrain only outward axial movement of the bearings by constraining axial movement of the bearings towards each other.

Unlike FIG. 3, FIG. 4 shows an embodiment where not only the inboard bearing 268 has been modified from the design of bearing 168, but the outboard bearing 270 has also been modified. Inboard bearing 268 has an annular lubrication seal 352 built into the bearing so that the elastomeric lip seal is frictionally fitted into the cup portion 354 of the bearing and the lip 356 bears on the cone portion 358. Since the lip does this, the lubrication seal 352 is constrained within the axial bearing space and the spindle 152 is completely free of any contact with the hub or any hub components inboard of the shoulder 164, allowing alternate use of this region, one example of which would be placement of a angular velocity sensor device. To accommodate the placement of the lubrication seal 352 into the bearing, the rollers 360 of bearing 268 will have a shorter length than in bearing 168.

Similarly, outboard bearing 270 has an annular lubrication seal 362 built into the bearing so that the elastomeric lip seal is frictionally fitted into the cup portion 364 of the bearing and the lip 366 bears on the cone portion 368. Because of this, the lubrication seal 362 is constrained within the axial bearing space and there is no interference of the lubrication seal 362 with the outboard bearing retainer 156. To accomodate the placement of the lubrication seal 362 into the bearing, the rollers 370 of bearing 270 will have a shorter length than in bearing 170. The use of this additional lubrication seal 362 would be expected to improve the overall sealing of the lubrication reservoir, particularly in the internal portion 196 of the central aperture of the wheel hub, so a grease-based lubrication system would be more likely to be successful than in the prior art. This would be expected to result in fewer failures of the wheel mount due to lubrication loss.

The method for assembling the wheel mount 200 or 250 as shown in FIG. 3 or 4 is essentially the same regardless of whether the axle is a driven or non-driven axle. First, an inboard bearing such as 218 or 268 is press-fit into an inboard bore 126 or 176 in a central aperture 122 or 172 in a hub 108 or 158. The hub is then seated onto an axle spindle 102 or 152 such that the inner circumference of the inboard bearing 218 or 268 rests upon an inboard land 110 or 160 formed on the spindle and an inboard end of the inboard bearing rests against a shoulder 114 or 164 formed at an inboard end of the inboard land. At this point, a careful measurement of the axial distance from an outboard end of the inboard bearing 218 or 168 to a fixed point on the outboard end of the hub, which is seated upon the spindle at this point, is made, so that a conical shim 300 or 350 may be selected from a plurality of such conical shims of varying lengths. The selection is to be made to provide a slight interference fit in the axial direction of the conical shim between the cone portion of the inboard bearing and the cone portion of an outboard bearing 220 or 270 when the conical shim is placed on the spindle and the outboard bearing is press fit into an outboard bore 128 or 178 in the central aperture in the hub. An outboard bearing retainer 116 or 166 is then placed onto the distal end 106 or 156 of the spindle to hold the outboard bearing between it and the outboard end of the conical shim. The outboard bearing retainer 116 or 166 should be tightened to a specified torque with an appropriate tool such as a torque wrench. The retainer should not be tightened beyond the recommended or specified torque.

Although the present invention has been described above in detail, the same is by way of illustration and example only and is not to be taken as a limitation on the present invention. Accordingly, the scope and content of the present invention are to be defined only by the terms of the appended claims.

What is claimed is:

1. A mount for a wheel of a vehicle comprising:
    a spindle extending from an end of an axle, said spindle generally decreasing in diameter from a proximal end thereof to a distal end thereof and provided with an inboard land near the proximal end and an outboard land near the distal end, the spindle further having an inboard bearing retainer near the proximal end and an outboard bearing retainer near the distal end, said inboard and outboard bearing retainers defining an axial bearing space;
    a hub surrounding said spindle, said hub having a central aperture with an inboard land and an outboard land provided on an internal surface of the central aperture;
    a bearing assembly interposed between the spindle and the hub, the bearing assembly having an inboard bearing and an outboard bearing in spaced apart relationship within the axial bearing space, the inboard bearing having an internal diameter larger than an internal diameter of the outboard bearing, each of the bearings comprising a cylindrical cone with an outer raceway, a cylindrical cup with an inner raceway and a plurality of tapered rollers circumferentially spaced in a cage mounted in the raceways;
    a conical shim, interposed between the cylindrical cones of the inboard and outboard bearings; and
    an annular grease seal is mounted within the axial bearing space on the inboard side of the inboard bearing between the cup and the cone.
2. The wheel mount assembly of claim 1 wherein the inboard bearing retainer is a shoulder at the inboard end of the inboard land.
3. The wheel mount assembly of claim 1 wherein the outboard bearing retainer is a removable fastener affixed to the outboard end of the outboard land.
4. The wheel mount of claim 1 wherein the spindle is not hollow.
5. The wheel mount of claim 1 wherein the spindle is hollow.
6. The wheel mount of claim 1 wherein the cups of the respective inboard and outboard bearings are seated atop the inboard and outboard lands of the spindle, wherein the bearings are maintained in spaced apart relationship in the axial bearing space by the co-action of the conical shim, the outboard bearing retainer and the inboard bearing retainer.
7. The wheel mount of claim 1 wherein the cups of the respective inboard and outboard bearings are seated in the inboard and outboard lands of the hub and are maintained in spaced apart relationship in the axial bearing space by a shoulder formed at the inside end of each said land.
8. The wheel mount of claim 1 wherein a closed grease reservoir is formed on the hub, enclosing the distal end of the spindle and the outboard bearing.
9. The wheel mount of claim 1 wherein an annular grease seal is mounted within the axial bearing space on the outboard side of the outboard bearing between the cup and the cone.
10. The wheel mount of claim 1 wherein the conical shim is selected at the time of installation from a plurality of such shims having different axial lengths.
11. A method for assembling a wheel mount for a vehicle, comprising the sequential steps of:
    (a) press-fitting an inboard bearing assembly into an inboard bore in a central aperture in a hub;
    (b) seating the hub with the inboard bearing assembly onto an axle spindle such that the inner circumference of the inboard bearing rests upon an inboard land formed on said spindle and an inboard end of the inboard bearing rests against a shoulder formed at an inboard end of the inboard land;

(c) measuring the axial distance from an outboard end of the inboard bearing to a fixed point on the outboard end of the seated hub;

(d) selecting a conical shim from a plurality of conical shims of varying lengths, based upon the axial distance measurement;

(e) inserting the selected conical shim between the spindle and the hub from the outboard end of the hub so that the conical shim bears against a cone portion of the inboard bearing assembly;

(f) press-fitting an outboard bearing assembly into an outboard bore in the central aperture in the hub so that the outboard bearing is seated on an outboard land on the spindle and bears against an outboard end of the conical shim; and (g) affixing an outboard bearing retainer on the outboard end of the spindle to hold the outboard bearing between it and the outboard end of the conical shim.

* * * * *